(12) United States Patent
Lyashevsky (10) Patent No.: US 8,810,562 B2
(45) Date of Patent: Aug. 19, 2014

(54) HIERARCHICAL LOSSLESS COMPRESSION

(75) Inventor: Alexander M Lyashevsky, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 485 days.

(21) Appl. No.: 12/468,757

(22) Filed: May 19, 2009

(65) Prior Publication Data

US 2010/0299454 A1  Nov. 25, 2010

(51) Int. Cl.
*G06F 17/00* (2006.01)
*G09G 5/02* (2006.01)

(52) U.S. Cl.
USPC ............ 345/418; 345/555; 345/589; 345/605

(58) Field of Classification Search
CPC combination set(s) only.
See application file for complete search history.

(56) References Cited

U.S. PATENT DOCUMENTS

| | | | |
|---|---|---|---|
| 6,556,719 B1* | 4/2003 | Monro | 382/248 |
| 6,630,933 B1* | 10/2003 | Van Hook | 345/422 |
| 8,014,611 B2* | 9/2011 | Morohashi | 382/232 |
| 2002/0168112 A1* | 11/2002 | Schwartz et al. | 382/240 |

FOREIGN PATENT DOCUMENTS

WO    97/02705    1/1997

OTHER PUBLICATIONS

International Search Report from EP Patent Office; International Application No. PCT/US2010/035228; dated Dec. 7, 2010.
Lipchak; Benj; "2d and 3d Progressive Transmission Using Wavelets"; Worcester Polytechnic Institute, Department of Computer Science; Mar. 25, 1997.
Munkberg, Jacob et al.; "High Quality Normal Map Compression"; Proceedings of the 21st ACM Siggraph/Eurographics Symposium on Graphics Hardware; Vienna, Austria; Sep. 4, 2006.
Walker, James et al.; "Wavelet-Based Image Compression"; In: Rao K R; Yip P C; "The Transform and Data Compression Handbook"; Sep. 27, 2000.

* cited by examiner

*Primary Examiner* — Kee M Tung
*Assistant Examiner* — Leon T Cain, II
(74) *Attorney, Agent, or Firm* — Faegre Baker Daniels LLP (57) ABSTRACT

A method is provided for data compression. The data compression method transforms a square of data into a tile of data. The tile of data is then divided into quads of data that are converted into a representative element, a first delta element, a second delta element, a third delta element, and a control word. A new tile of data is then formed with the representative elements, and the process is repeated until a single representative element remains. The single representative element is then embedded into an output stream with the control words and corresponding delta elements. Decompression of the data is symmetrical to the encoding once the bit stream has been parsed.

22 Claims, 10 Drawing Sheets

| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 1 | 1 | 1 | 1 | 1 | 0 | 0 | 0 | 0 | 0 | 0 | 0 | 0 | 0 | 0 |
| 0 | 0 | 0 | 0 | 0 | 0 | 0 | 0 | 0 | 0 | 1 | 1 | 1 | 1 | 1 | 1 | 0 | 0 | 0 | 0 | 0 | 0 | 0 | 0 | 0 | 0 |
| 0 | 0 | 0 | 0 | 0 | 0 | 0 | 0 | 0 | 1 | 1 | 1 | 1 | 1 | 1 | 1 | 0 | 0 | 0 | 0 | 0 | 0 | 0 | 0 | 0 | 0 |
| 0 | 0 | 0 | 0 | 0 | 0 | 0 | 0 | 0 | 1 | 1 | 1 | 1 | 1 | 1 | 1 | 0 | 0 | 0 | 0 | 0 | 0 | 0 | 0 | 0 | 0 |
| 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 0 | 0 |
| 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 0 | 0 |
| 0 | 0 | 0 | 0 | 0 | 0 | 0 | 1 | 1 | 1 | 1 | 1 | 1 | 1 | 1 | 1 | 0 | 0 | 0 | 0 | 0 | 0 | 0 | 0 | 0 | 0 |
| 0 | 0 | 0 | 0 | 0 | 0 | 0 | 1 | 1 | 1 | 1 | 1 | 1 | 1 | 1 | 1 | 0 | 0 | 0 | 0 | 0 | 0 | 0 | 0 | 0 | 0 |
| 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 0 | 0 |
| 0 | 0 | 0 | 0 | 0 | 0 | 0 | 0 | 0 | 1 | 1 | 1 | 1 | 1 | 1 | 1 | 0 | 0 | 0 | 0 | 0 | 0 | 0 | 0 | 0 | 0 |
| 0 | 0 | 0 | 0 | 0 | 0 | 0 | 0 | 0 | 0 | 1 | 1 | 1 | 1 | 1 | 1 | 1 | 0 | 0 | 0 | 0 | 0 | 0 | 0 | 0 | 0 |
| 0 | 0 | 0 | 0 | 0 | 0 | 0 | 0 | 0 | 0 | 0 | 1 | 1 | 1 | 1 | 1 | 1 | 1 | 0 | 0 | 0 | 0 | 0 | 0 | 0 | 0 |
| 0 | 0 | 0 | 0 | 0 | 0 | 0 | 0 | 0 | 0 | 0 | 0 | 1 | 1 | 1 | 1 | 1 | 1 | 1 | 0 | 0 | 0 | 0 | 0 | 0 | 0 |
| 0 | 0 | 0 | 0 | 0 | 0 | 0 | 0 | 0 | 0 | 0 | 0 | 1 | 1 | 1 | 1 | 1 | 1 | 1 | 1 | 0 | 0 | 0 | 0 | 0 | 0 |
| 0 | 0 | 0 | 0 | 0 | 0 | 0 | 0 | 0 | 0 | 0 | 0 | 1 | 1 | 1 | 1 | 1 | 1 | 1 | 1 | 0 | 0 | 0 | 0 | 0 | 0 |
| 0 | 0 | 0 | 0 | 0 | 0 | 0 | 0 | 0 | 0 | 0 | 1 | 1 | 1 | 1 | 1 | 1 | 1 | 1 | 1 | 0 | 0 | 0 | 0 | 0 | 0 |
| 0 | 0 | 0 | 0 | 0 | 0 | 0 | 0 | 0 | 0 | 1 | 1 | 1 | 1 | 1 | 1 | 1 | 1 | 1 | 1 | 0 | 0 | 0 | 0 | 0 | 0 |
| 0 | 0 | 0 | 0 | 0 | 0 | 0 | 0 | 0 | 1 | 1 | 1 | 1 | 1 | 1 | 1 | 1 | 1 | 1 | 1 | 0 | 0 | 0 | 0 | 0 | 0 |
| 0 | 0 | 0 | 0 | 0 | 0 | 0 | 0 | 1 | 1 | 1 | 1 | 1 | 1 | 1 | 1 | 1 | 1 | 1 | 0 | 0 | 0 | 0 | 0 | 0 | 0 |
| 0 | 0 | 0 | 0 | 0 | 0 | 0 | 1 | 1 | 1 | 1 | 1 | 1 | 1 | 1 | 1 | 1 | 1 | 1 | 0 | 0 | 0 | 0 | 0 | 0 | 0 |
| 0 | 0 | 0 | 0 | 0 | 0 | 1 | 1 | 1 | 1 | 1 | 1 | 1 | 1 | 1 | 1 | 1 | 1 | 0 | 0 | 0 | 0 | 0 | 0 | 0 | 0 |
| 0 | 0 | 0 | 0 | 0 | 0 | 1 | 1 | 1 | 1 | 1 | 1 | 1 | 1 | 1 | 1 | 1 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

Fig. 1B  103

| 0 | 0 | 0 | 0 | 0 | 0 | 0 | 0 | 0 | 0 | 0 | 0 | 0 |
|---|---|---|---|---|---|---|---|---|---|---|---|---|
| 0 | 0 | 0 | 0 | 0 | 0 | 0 | 0 | 0 | 0 | 0 | 0 | 0 |
| 0 | 0 | 0 | 0 | 0 | 0 | 0 | 1 | 1 | 1 | 1 | 1 | 1 |
| 0 | 0 | 0 | 0 | 0 | 0 | 1 | 1 | 1 | 1 | 1 | 1 | 1 |
| 0 | 0 | 0 | 0 | 0 | 0 | 1 | 1 | 1 | 1 | 1 | 1 | 1 |
| 0 | 0 | 0 | 0 | 0 | 0 | 1 | 1 | 1 | 1 | 1 | 1 | 1 |
| 0 | 0 | 0 | 0 | 0 | 0 | 1 | 1 | 1 | 1 | 1 | 1 | 1 |
| 0 | 0 | 0 | 0 | 0 | 0 | 0 | 1 | 1 | 1 | 1 | 1 | 1 |
| 0 | 0 | 0 | 0 | 0 | 0 | 0 | 1 | 1 | 1 | 1 | 1 | 1 |
| 0 | 0 | 0 | 0 | 0 | 0 | 0 | 1 | 1 | 1 | 1 | 1 | 1 |
| 0 | 0 | 0 | 0 | 0 | 0 | 0 | 0 | 1 | 1 | 1 | 1 | 1 |
| 0 | 0 | 0 | 0 | 0 | 0 | 0 | 0 | 1 | 1 | 1 | 1 | 1 |
| 0 | 0 | 0 | 0 | 0 | 0 | 0 | 0 | 1 | 1 | 1 | 1 | 1 |
| 0 | 0 | 0 | 0 | 0 | 0 | 0 | 0 | 0 | 1 | 1 | 1 | 1 |

| A1 | A2 | A3 | A4 | A5 | A6 | A7 | A8 |
|----|----|----|----|----|----|----|----|
| B1 | B2 | B3 | B4 | B5 | B6 | B7 | B8 |
| C1 | C2 | C3 | C4 | C5 | C6 | C7 | C8 |
| D1 | D2 | D3 | D4 | D5 | D6 | D7 | D8 |
| E1 | E2 | E3 | E4 | E5 | E6 | E7 | E8 |
| F1 | F2 | F3 | F4 | F5 | F6 | F7 | F8 |
| G1 | G2 | G3 | G4 | G5 | G6 | G7 | G8 |
| H1 | H2 | H3 | H4 | H5 | H6 | H7 | H8 |

| A2-A1 | A2-A1 | A3-A2 | A4-A3 | A5-A4 | A6-A5 | A7-A6 | A8-A7 |
|-------|-------|-------|-------|-------|-------|-------|-------|
| B1-A1 | B2-B1 | B3-B2 | B4-B3 | B5-B4 | B6-B5 | B7-B6 | B8-B7 |
| C1-B1 | C2-C1 | C3-C2 | C4-C3 | C5-C4 | C6-C5 | C7-C6 | C8-C7 |
| D1-C1 | D2-D1 | D3-D2 | D4-D3 | D5-D4 | D6-D5 | D7-D6 | D8-D7 |
| E1-D1 | E2-E1 | E3-E2 | E4-E3 | E5-E4 | E6-E5 | E7-E6 | D8-D7 |
| F1-E1 | F2-F1 | F3-F2 | F4-F3 | F5-F4 | F6-F5 | F7-F6 | F8-F7 |
| G1-F1 | G2-G1 | G3-G2 | G4-G3 | G5-G4 | G6-G5 | G7-G6 | G8-G7 |
| H1-G1 | H2-H1 | H3-H2 | H4-H3 | H5-H4 | H6-H5 | H7-H6 | H8-H7 |

HIERARCHICAL LOSSLESS COMPRESSION

FIELD OF THE INVENTION

The present invention relates to data compression. More particularly, the present invention relates to lossless data compression suitable for hardware implementation.

BACKGROUND OF THE INVENTION

Data compression is the process of converting data to be stored using less bits. The two types of data compression are lossy and lossless. Lossy data compression compresses data to a greater degree, but loses data during the process. Thus, during decompression, the data is an approximation of its original form rather than an exact replica. Lossless data compression compresses data to a lesser degree, but does not lose any data during the process. Accordingly, during decompression, the data is reconstructed exactly as it was before compression. The objective of data compression is to reduce the amount of bandwidth necessary for transmission and/or memory necessary for storage.

An example of a common lossless compression technique is Huffman coding. Huffman coding is based on the frequency of occurrence of a data item. The technique uses a lower number of bits to encode the data that occurs more frequently. Unfortunately, a limitation of Huffman coding is that it has a fixed sequence length procedure and cannot compress redundancy in data that exceeds the sequence length. As a result, Huffman coding is complex and requires a large amount of memory to be effective. Huffman coding involves performing an analysis of the entire file before any part of the file can be extracted. Further, the Huffman technique is asymmetrical by nature, meaning the decoding process is much slower than the encoding process. Such a characteristic is unacceptable for certain hardware implementations because a computer is generally designed to read and write approximately the same amount of data on a single clock cycle.

Another common lossless technique is the Lempel-Ziv-Welch method (LZW). LZW automatically builds a dictionary of previously seen strings in the data file being compressed. The dictionary starts off with 256 entries, one for each possible character. Every time a string not already in the dictionary is seen, a longer string consisting of that string is appended. The output consists of integer indices into the dictionary. Unfortunately, LZW suffers by virtue of the string table it generates. The dictionary can get very large in a short amount of time. In addition, the amount of storage needed is indeterminate, as the amount of memory needed depends on the total length of all the strings. Also, as with Huffman encoding, the entire file must be encoded and/or decoded before any part of the file is compressed and/or decompressed. Further, the entire process is asymmetrical in nature and takes a considerable amount of time longer compressing than decompressing.

Apart from the limitations imposed by the above compression techniques, another major problem is the lack of a uniform compression method for different formats of data. For example, a computer graphic composed of pixels can be represented using Z-buffering. Z-buffering works by testing pixel depth and comparing the current position of the Z coordinate, with data stored in the Z-buffer. The Z-buffer stores information about the last position of each pixel. The pixel in the closer position to the viewer is the one that will be displayed. Other common data formats used to represent graphics composed of pixels are color buffering and normal maps. Currently, there is no lossless compression technique for normal map data, and color buffering data requires a distinct compression method that is software-oriented.

What is needed is a data compression/decompression method that is symmetrical in nature and thereby suitable for hardware implementation. Further, what is needed is a data compression/decompression method that can compress and decompress several different data formats, including normal map data. In addition, what is needed is a data compression/decompression method that is adaptable to a variety of graphical hardware devices.

SUMMARY OF THE INVENTION

In one aspect of the present invention, a hierarchical data compression method is provided comprising a computer performing the steps of: arranging data into a primary array; dividing the primary array into a plurality of primary subarrays; compressing each primary subarray into a compressed subarray such that a plurality of compressed subarrays are formed; arranging the compressed subarrays into a secondary array; and repeating the steps of dividing, compressing and arranging until a single subarray remains, wherein the secondary array becomes the primary array for the repetition of these steps. Data from the compressed subarrays can be embedded into an output stream.

In another aspect of the present invention, a data compression method is provided comprising a computer performing the steps of: providing a square of data; transforming the square of data into a tile of data; dividing the tile of data into quads of data, each quad having an upper left pixel, an upper right pixel, a lower left pixel, and a lower right pixel; converting each quad into a representative element, a first delta element, a second delta element, a third delta element, and a control word; forming a new tile of data with the representative elements; repeating the dividing, the converting, and the forming until a single representative element remains, wherein the new tile of data becomes the tile of data for the repetition of the dividing, converting and forming steps; and embedding the single representative element, the control words and the delta elements into an output stream.

In yet another aspect of the present invention, a program storage device readable by a machine is provided. The device tangibly embodies a program of instructions executable by the machine to perform a data compression method, the method comprising: providing a square of data; transforming the square of data into a tile of data; dividing the tile of data into quads of data, each quad having an upper left pixel, an upper right pixel, a lower left pixel, and a lower right pixel; converting each quad into a representative element, a first delta element, a second delta element, a third delta element, and a control word; forming a new tile of data with the representative elements; repeating the dividing, the converting, and the forming until a single representative element remains, wherein the new tile of data becomes the tile of data for the repetition of the dividing, converting and forming steps; and embedding the single representative element, the control words and the delta elements into an output stream.

The present invention encompasses other embodiments that are configured as set forth above and below, and with other features and alternatives as well.

BRIEF DESCRIPTION OF THE DRAWINGS

The present invention will be readily understood by the following detailed description in conjunction with the accompanying drawings. To facilitate this description, like reference numerals designate like elements.

DETAILED DESCRIPTION OF THE PREFERRED EMBODIMENT(S)

An invention for a hierarchical lossless data compression method is disclosed. Numerous specific details are set forth in order to provide a thorough understanding of embodiments of the present invention. It will be understood, however, to one skilled in the art that embodiments of the present invention may be practiced with other specific details.

In one embodiment, a two-dimensional surface of data is conceptually divided into squares of data. It will be understood that there is no physical square. However, considering the square as a physical entity with dimensions (length and width) and a surface can aid in understanding the concepts for the invention. The two-dimensional surface of data contains pixel bits representing a graphical image. The two-dimensional surface of data is divided into squares of data that are 16×16 squares in size. In alternate embodiments, the two-dimensional surface of data can be divided into any number of larger or smaller squares of data depending on the desired compression or underlying data format. For example, the two-dimensional surface of data can be divided into 8×8 squares of pixel data.

Each square of data is then transformed into a tile of data. The transform is performed using integer add or subtract operations suitable for hardware implementation. The technique used to transform the square of data into a tile of data can depend on the data format used to represent the graphical image. For example, if the data format is Z buffering, the second column of the tile of data is set equal to the second column of the square of data subtracted by the first column; the third column of the tile of data is set equal to the third column of the square of data subtracted by the second column of the square of data; the fourth column of the tile of data is set equal to the fourth column of the square of data subtracted by the third column of the square of data; and the pattern repeats until each data value is subtracted by an adjacent data value and the difference stored in the tile of data.

In alternative embodiments, different data formats can be transformed into tiles using different techniques. For example, to transform a square of color buffer data, for each pixel, the first channel in the square of data is subtracted by the second channel in the square of data. The resulting value is stored in the first channel in the tile of data. The second channel in the square of data is stored in the second channel in the tile of data. The third channel in the square of data is subtracted by the first channel in the square of data and that value is stored in the third channel in the tile of data. The pattern repeats until the decorrelation transform is performed on each pixel.

In another embodiment, to transform normal map data, for each pixel, the first channel in the square of data is dropped and a bit representing its sign is stored in the first channel in the tile of data. The second and third channel in the square of data is stored in the second and third channel in the tile of data, respectively.

After the square of data is transformed into a tile of data, the tile is divided into quads. The quads are preferably 2×2 having an upper left pixel, an upper right pixel, a lower left pixel, and a lower right pixel. Once the tile is divided into quads, the quads are converted into a representative element, three delta elements, and a control word. The conversion preferably comprises an integer add or subtract operation suitable for hardware implementation. Depending on the data format, different techniques can be used to convert the quads of data into a representative element, 3 delta elements, and a control word. Examples of different conversion techniques will be discussed in further detail later.

After the quads have been converted, a new tile is formed with the resulting representative elements. The new tile is then divided into quads, and those quads are converted into a representative element, 3 deltas and a control word. Once again, the resulting representative elements form another new tile, and that tile is divided into quads, which are converted into a representative element, 3 delta elements and a control word. The pattern is repeated until a single representative element remains. The result is a hierarchy of data with the top being the single representative element and the bottom being the converted quads of data representing the transformed square of data. Traversing from the bottom to the top, each level of the hierarchy has 4 times less quads. It should be noted that this design allows the entire process to be parallelized easily if multiple squares of data represent a graphical image.

Once a single representative element remains, the process of embedding the pixels into a tightly aligned pixel stream of compressed data begins. Control information is preferably first embedded into the stream, which can vary slightly depending on data format. For example, if Z-buffer or normal map data is used, the control information can include 256 pixelmap of the signs for each pixel. The single representative element is then embedded into the output stream with the proper number of pixels.

Dividing each of the tiles of data in the hierarchy into 4 equal squares creates 4 sub-tiles of data. For example, a tile of data would be divided such that the top left sub-tile is sub-tile zero, the top right sub-tile is sub-tile 1, the bottom left sub-tile is sub-tile 2 and the bottom right sub-tile is sub-tile 3. If, for example, the tile is 16×16, each sub-tile would be 8×8. Following the embedding of the single representative element, preferably a directory of the sub-tiles is embedded comprising of offsets. If, for example, the tile of data is 16×16, the offset for sub-tile 1 would be ([8,15] [0,7]) from sub-tile zero ([0,7] [0,7]), while the offset for sub-tile 2 would be ([0,7] [8,15]) from the start of sub-tile one, and sub-tile 3 would be ([8,15] [8,15]) from the start of sub-tile 2.

After the single representative element and the preferable directory of sub-tiles is embedded into the output stream, the delta elements from each of the quads are encoded. The encoding starts at the top of the hierarchy and proceeds down to the bottom. The quads are encoded according to their corresponding control words. The encoding preferably follows the sub-tile pattern. For example, all the deltas for sub-tile zero from the top to bottom would first be encoded followed by the deltas of sub-tile 1 from top to bottom. Then, the deltas of sub-tile 2 would be encoded from top to bottom followed by the encoding of the deltas of sub-tile 3. It should be noted that if the lower levels of the hierarchy can be fully decoded from higher levels, encoding of the lower levels is avoided and compression is increased.

The encoded pixels are then embedded into the output stream preferably following the sub-tile pattern. The embedding of the encoded pixels will preferably start with the pixels representing the top quad for sub-tile zero. Next, the encoded pixels on lower levels of the hierarchy for sub-tile zero are embedded into the output stream from top to bottom. Then, the pixels representing the top quad for sub-tile 1 will be embedded. Next, a directory for sub-tile 1 is preferably embedded into the output stream. For example, if the square of data is 16×16, the directory for sub-tile one would be the offset ([4,7][0,3]). Following the directory, the encoded pixels on the lower levels of the hierarchy for sub-tile 1 will then be embedded into the output stream from top to bottom. Next, the pixels representing the top quad for sub-tile 2 will be embedded. Then, a directory for sub-tile 2 is preferably embedded into the output stream. For example, if the square of data is 16×16 the directory for sub-tile 2 would be the offset ([0,3][4,7]). Following the directory, the encoded pixels on the lower levels of the hierarchy for sub-tile 2 will then be embedded into the output stream from top to bottom. Next, the pixels representing the top quad for sub-tile 3 will be embedded. Then, a directory for sub-tile 3 is embedded into the output stream. For example, if square of data is 16×16, the directory for sub-tile 3 would be the offset ([4,7][4,7]). Following the directory, the encoded pixels on the lower levels of the hierarchy for sub-tile 3 will then be embedded into the output stream from top to bottom.

As mentioned earlier, depending on the data format, different techniques can be used to convert the quads of data into a representative element, 3 delta elements, and a control word. For example, to convert color buffer or normal map data, the representative element is set to equal the upper left pixel of the quad. The first delta element equals the upper right pixel subtracted by the upper left pixel. The second delta element equals the lower left pixel subtracted by the upper left pixel. The third delta element equals the lower right pixel subtracted by the lower left pixel. The control word is set according to the correlation between the delta elements. If all of the delta elements equal zero, then the control word is set to zero. During pixel allocation, this is the signal for the pixel allocator to abort any further allocation of pixels for the quad. If the delta elements do not equal zero, then the control word is set depending on the maximum absolute value among the 3 deltas. If the maximum absolute among the deltas is less than or equal to one, then the control word is set to 1. If the maximum absolute value among the deltas is less than or equal to 3, then the control word is set to 2. If the maximum absolute value among the deltas is less than or equal to 7, then the control word is set to 3. If the maximum absolute value among the deltas is higher than 7, then a different strategy is employed. Assuming that the maximum absolute value among the deltas is higher than 7, the mean of the upper left pixel, the upper right pixel, the lower left pixel and the lower right pixel is calculated. The representative element is reset to equal the mean of the quad pixels. The first delta element is reset to equal the upper left pixel subtracted by the mean. The second delta element is reset to equal the upper right pixel subtracted by the mean. The third delta element is reset to equal the lower left pixel subtracted by the mean. The control word is set to 4 if the maximum absolute value among the reset delta elements is less than or equal to 7. The control word is set to 5 if the maximum absolute value among the reset delta elements is less than or equal to 15.

If the maximum absolute value among the reset delta elements is greater than 15, then the control word is set to 6 and the representative and delta elements are set as the original quad pixels. Therefore, assuming the maximum absolute value among the reset delta elements is greater than 15, the representative element equals the upper left pixel, the first delta element equals the upper right pixel, the second delta element equals the lower left pixel, and the third delta element equals the lower right pixel.

The encoding and embedding of the deltas can be different depending on the data format. According to the preferred embodiment, there is a 6 bit prefix which defines how the data is encoded. There are 2 bits for each buffer. Each 2 bit control word can be 00, 01, 10 or 11.

| 2 bits | 2 bits | 2 bits |
|---|---|---|

In one example, Z-buffer data is used and the control word is 2 bits. If the control word is '00', then only the control word is embedded into the output stream and no other data is embedded. This allows significant compression where there is no change in the data. If the control word is '01', the control word is embedded and the deltas are embedded with their corresponding pixel values. Finally, if the control word is '11', the bits representing the control word are embedded and the deltas are encoded according to an associated case (see the following table).

| D1 | Y | N | N | N | Y | Y | Y |
|---|---|---|---|---|---|---|---|
| D2 | N | Y | N | Y | N | Y | Y |
| D3 | N | N | Y | Y | Y | N | Y |
| Case | 0 | 1 | 2 | 3 | 4 | 5 | 6 |

The coding includes a 5 bit prefix defining the number of bits, plus a sign bit. If the case is zero, 1, or 2, a single value is embedded with the prefix into the output stream specifying the maximum number of bits is 1. If the case is 3, 4, or 5, 2 values are embedded with the prefix into the output stream specifying that the maximum number of bits among those is 2. If the case is 6, 3 values are embedded with the prefix into the output stream specifying that the maximum number of bits among those is 3. In alternate embodiments, the delta elements can be encoded and embedded using a different technique.

For example, if color buffer or normal map data is used, and the control word is zero, the 3 bits representing the control word are embedded into the output stream and no other data is embedded. For color, 3 bit control words are used.

If the control word is 1, the 3 bits representing the control word are embedded into the output stream. Then, one bit representing the first delta element is embedded, followed by a bit representing the sign of the first delta element. Next, one bit representing the second delta element is embedded, followed by the bit representing the sign of the second delta element. Then, one bit representing the third delta element is embedded, followed by the bit representing the sign of the third delta element.

If the control word is 2, the three bits representing the control word are embedded into the output stream. Then, 2 bits representing the first delta element are embedded, followed by the bit representing the sign of the first delta element. Next, 2 bits representing the second delta element are embedded, followed by the bit representing the sign of the second delta element. Then, 2 bits representing the third delta element are embedded, followed by the bit representing the sign of the third delta element.

If the control word is 3, the 3 bits representing the control word are embedded into the output stream. Then, the 3 bits representing the first delta element are embedded, followed by the bit representing the sign of the first delta element. Next, 3 bits representing the second delta element are embedded, followed by the bit representing the sign of the second delta element. Then, 3 bits representing the third delta element are embedded, followed by the bit representing the sign of the third delta element.

If the control word is 4, the three bits representing the control word are embedded into the output stream. Then, 2 bits representing the mean of the quad are embedded, followed by the bit representing the sign of the mean. Next, 3 bits representing the first delta element are embedded, followed by the bit representing the sign of the first delta element. Then, 3 bits representing the second delta element are embedded, followed by the bit representing the sign of the second delta element. Next, 3 bits representing the third delta element are embedded, followed by the bit representing the sign of the third delta element.

If the control word is 5, the 3 bits representing the control word are embedded into the output stream. Then, 2 bits representing the mean of the quad are embedded, followed by the bit representing the sign of the mean. Next, 4 bits representing the first delta element are embedded, followed by the bit representing the sign of the first delta element. Then, 4 bits representing the second delta element are embedded, followed by the bit representing the sign of the second delta element. Next, 4 bits representing the third delta element are embedded, followed by the bit representing the sign of the third delta element.

If the control word is 6, the 3 bits representing the control word are embedded into the output stream. Then, the 8 bits representing the first delta element are embedded, followed by the bit representing the sign of the first delta element. Next, 8 bits representing the second delta element are embedded, followed by the bit representing the sign of the second delta element. Then, 8 bits representing the third delta element are embedded, followed by the bit representing the sign of the third delta element.

If the control word is 7, then the data is filled with all zeros.

In order to reconstruct the output stream, the decoding process begins by parsing the bit-aligned stream. Once the bit-aligned stream has been parsed, inverse conversions and transforms are performed to reconstruct the data. The decoding process is entirely symmetrical to the encoding process. Once the top level of the data hierarchy is decoded, the lower levels can be decoded in parallel if provided with the start position inside the bit stream for each of them. Directories of the appropriate offsets for the sub-tiles are preferably embedded within the output stream to allow for parallel bit stream decoding.

The above steps can be performed on a variety of data formats in an array of combinations to accomplish the same results. In particular, the data format can be any convenient and/or known data format that can be expressed as a two-dimensional surface of data. For example, the data format can represent still pictures, moving video, textures and can be in float32 and/or fixed24 formats. Further, the transforms and/or conversions performed on the squares and/or quads of data can be performed in any convenient and/or known manner to accomplish the same result. For example, the squares and quads of data can be added, subtracted, multiplied, divided and/or manipulated in any other way to achieve the same result. In addition, the bit allocation can be performed in any convenient and/or know manner. Exemplary additional control information can be added or no control information embedded into the output stream. Also, the deltas can be encoded at any convenient and/or known time during the process. The deltas can be encoded after the corresponding quad has been converted or as soon as quads on a similar level of the hierarchy have been converted and/or any other time prior to bit allocation. Further, additional directories can be included in the bit stream, or the directories can be removed to increase compression.

Figure 1A:
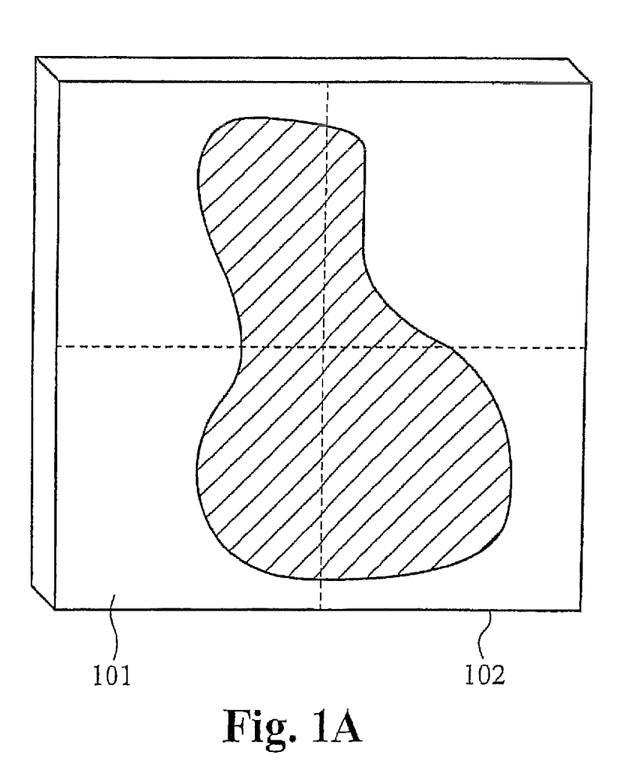
FIGS. 1A-1C show a 2-dimensional surface of data containing pixel bits, in accordance with an embodiment of the present invention.
Figure 1B:
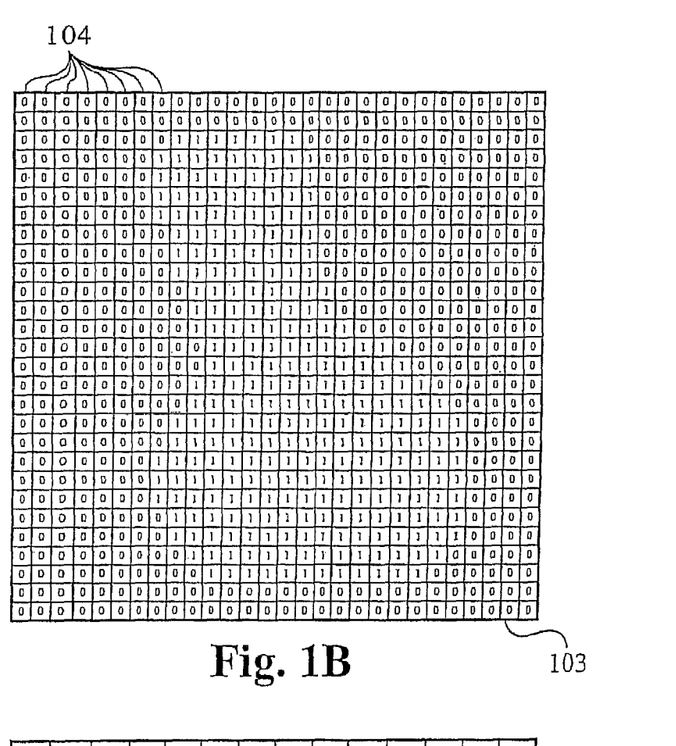
Figure 1C:
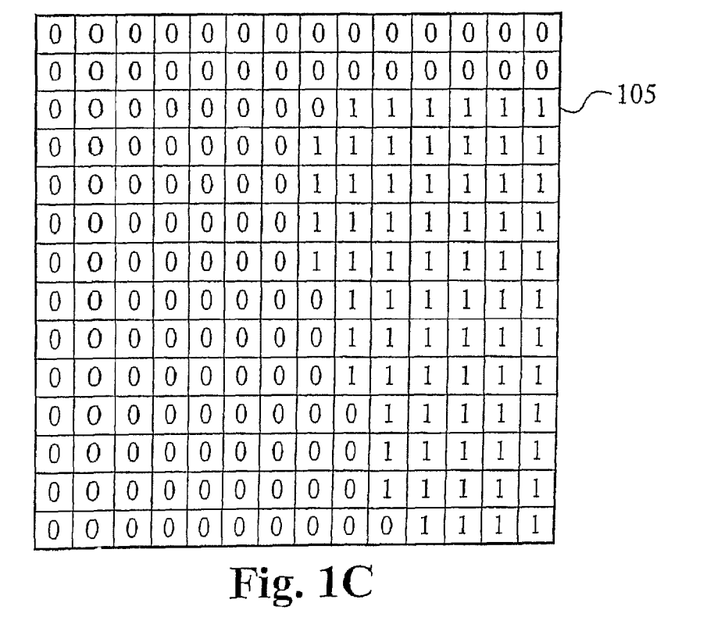

FIGS. 1A-1C show a graphical image represented by a two-dimensional surface of data containing pixels, in accordance with an embodiment of the present invention. In FIG. 1A, a graphical image 101 is displayed on a screen 102.

In FIG. 1B, the graphical image 101 is represented by a series of pixels 104 on a two-dimensional surface of data 103. The presence of the graphical image 101 is represented by a series of ones while the absence of the graphical image 101 is represented by zeros.

In FIG. 1C, a 16×16 square of data 105 has been divided from the two-dimensional surface of data 103 which can be compressed using hierarchical compression. The square of data 105 represents the upper left portion of the graphical image 101.

In alternate embodiments the two-dimensional surface of data can be any number of pixels wide by any number of pixels high. For example, the two-dimensional surface of data can be 4×4 or 1280×1024 or any other convenient or known width by height pixel display. In addition, the square of data 105 can be larger or smaller. For example, the square of data 105 can be an 8×8 division of the two-dimensional surface of data. Further, in alternate embodiments, additional squares of data can be divided from the two-dimensional surface of data and compressed in parallel.

Figure 2A:
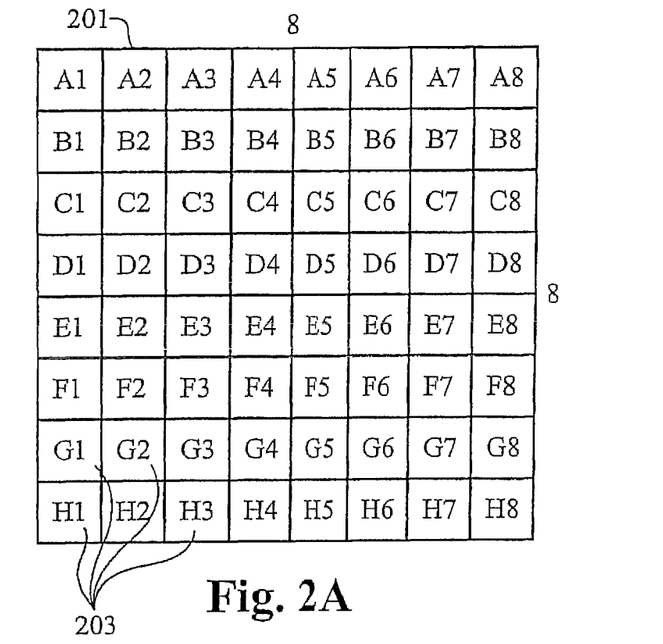
FIGS. 2A-2B show a square-to-tile transform, in accordance with an embodiment of the present invention.
Figure 2B:
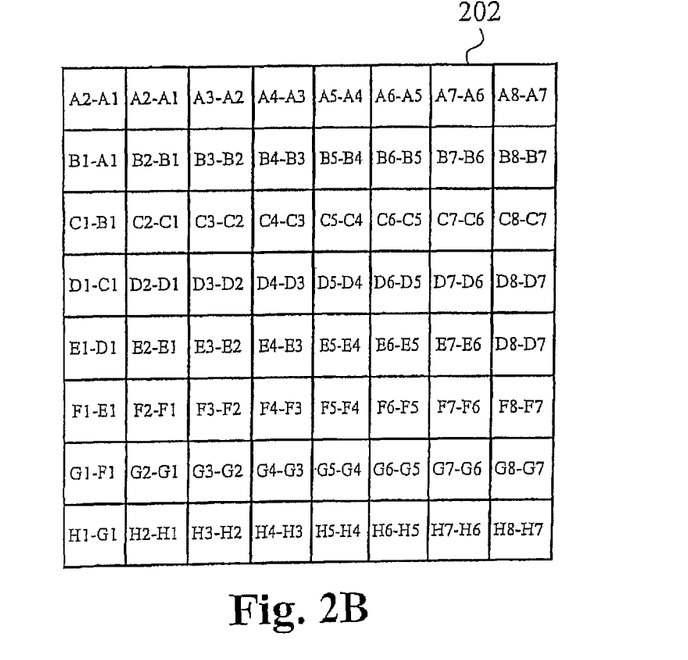

FIGS. 2A-2B show a square to tile transform, in accordance with an embodiment of the present invention. In FIG. 2A, an 8×8 square of data 201 contains values A1 to H8. The data 203 is in Z buffer format.

In FIG. 2B, the square of data 201 is transformed into a tile of data 202 by replacing all pixels with the difference in value between neighboring pixels. The transform for the Z-buffer data can follow the formula where T[i][j] represents the coordinates of the pixel in the tile coordinated with (j,i), S[i][j] represents the coordinates of the pixel in the square coordinated with (j,i), H represents tile height, and W represents tile width, moving horizontally from left to right along each row:
for (i=0 ... H−1)
for (j=0 ... W−1)

$$T[i][j]=S[i][j]-S[i][j-1]$$

Additionally, moving vertically from top to bottom along the $0^{th}$ column:
for (i=1 ... H−1)

$$T[i][0]=S[i][0]-S[i-1][0]$$

S[0][0] is kept unchanged, while T[0][0] is replaced with T[0][1] (i.e., the closest right neighbor). Thus, the pixel A2 is replaced by A2-A1. The pixel A3 is replaced by A3-A2. The process continues until the entire square of data 1 is transformed into a tile of data 202 containing the difference in value between neighboring pixels.

In alternative embodiments, the square of data can be transformed using a different technique depending on the data format. For example, if the square of data is color buffer format, the transform can follow the formula where T[i][j][c] represents the coordinates of the pixel in the tile coordinated with (j,i) and channel c of the pixel, S[i][j][c] represents the coordinates of the pixel in the square coordinated with (j,i) and channel c of the pixel, H represents tile height, and W represents tile width:

for (i=0 ... H−1)
for (j−0 ... W−1)

$T[i][j][0]=S[i][j][0]-S[i][j][1]$ $T[i][j][1]=S[i][j][1]$ $T[i][j][2]=S[i][j][2]-S[i][j][1]$

Thus, the $0^{th}$ channel of every tile pixel is equal to the $0^{th}$ channel of the corresponding square pixel subtracted by the $1^{st}$ channel of the corresponding square pixel. The $1^{st}$ channel of every tile pixel is equal to the $1^{st}$ channel of the corresponding square pixel. The $2^{nd}$ channel of every tile pixel is equal to the $2^{nd}$ channel of the corresponding square pixel subtracted by the $1^{st}$ channel of the corresponding square pixel. By performing a decorrelation transform on each pixel, the square of color buffer data is transformed into a tile of data.

In another example of an alternative embodiment, if the square of data is normal map format, the transform can follow the formula where T[i][j][c] represents the coordinates of the pixel in the tile coordinated with (j,i) and channel c of the pixel, S[i][j][c] represents the coordinates of the pixel in the square coordinated with (j,i) and channel c of the pixel, H represents tile height, and W represents tile width:

for (i=0 ... H−1)
for (j=0 ... W−1)

If $S[i][j][0]>0$ then $T[i][j][0]=1$; otherwise $T[i][j][0]=0$ $T[i][j][1]=S[i][j][1]$ $T[i][j][2]=S[i][j][2]$ Thus, the $0^{th}$ channel of every tile pixel is equal to 1 if the value stored in the $0^{th}$ channel of the corresponding square pixel is positive. Otherwise, the $0^{th}$ channel of the tile pixel is equal to 0. The $1^{st}$ and $2^{nd}$ channel of every tile pixel is equal to the $1^{st}$ and $2^{nd}$ channel of the corresponding square pixel respectively. By dropping the value of one component and saving the sign, the square of normal map data is transformed into a tile of data.

Figure 3A:
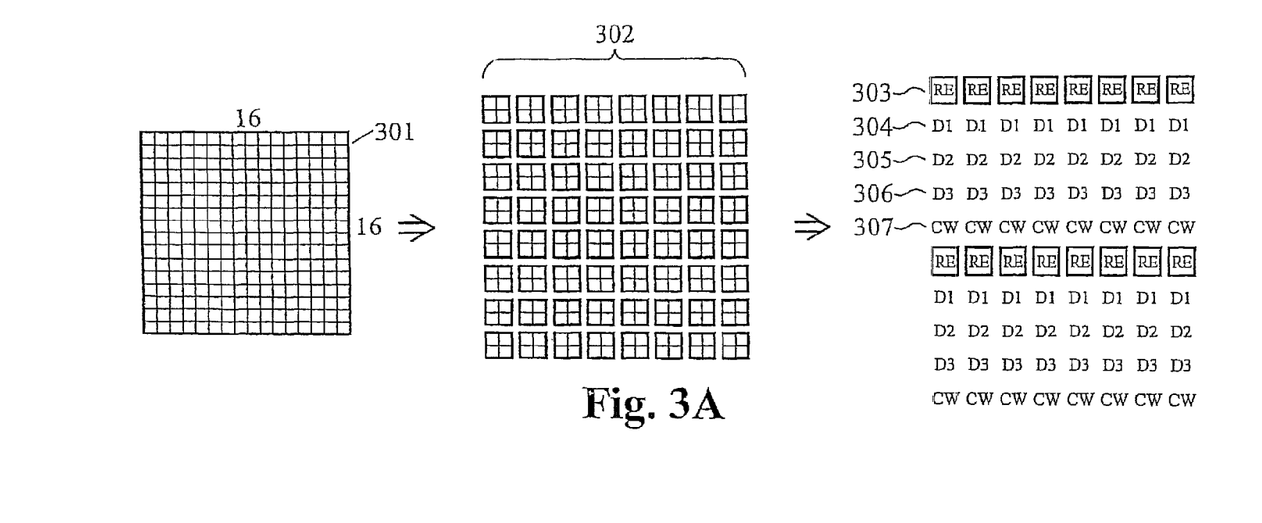
FIGS. 3A-3D show dividing of tiles, converting of quads, and forming of new tiles, in accordance with an embodiment of the present invention.

FIGS. 3A-3D show a series of tile divisions and quad conversions that create a hierarchy of data, in accordance with an embodiment of the present invention. In FIG. 3A, a tile of 16×16 data 301 is divided into quads of data 302. Each quad of data is converted into a representative element 303, a first delta element 304, a second delta element 305, a third delta element 306 and a control word 307. The division of the 16×16 tile 301 yields sixty-four quads 302. After conversion of the quads of data 302, sixty-four representative elements 303, sixty-four first delta elements 304, sixty-four second delta elements 305, sixty-four third delta elements 306, and sixty-four control words 307 are produced.

Figure 3B:
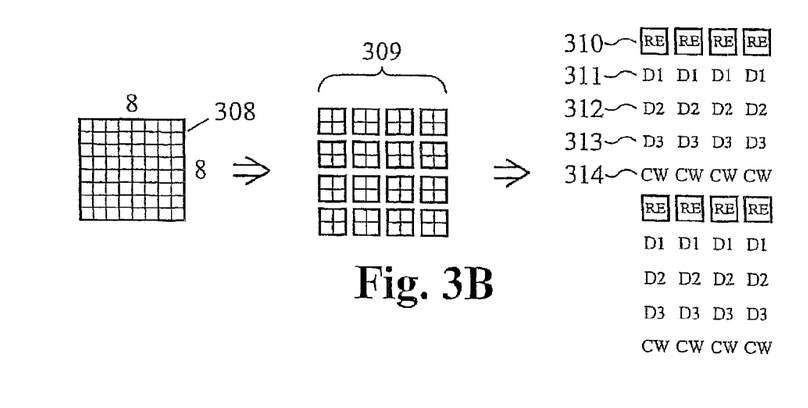

In FIG. 3B, the sixty-four representative elements 303 form a new tile 308. The 8×8 tile 308 of representative elements 303 is divided into quads of data 309. Each quad of data is converted into a representative element 310, a first delta element 311, a second delta element 312, a third delta element 313 and a control word 314. The division of the 8×8 tile 308 yields sixteen quads 309. After conversion of the quads of data 309, sixteen representative elements 310, sixteen first delta elements 311, sixteen second delta elements 312, sixteen third delta elements 313, and sixteen control words 314 are produced.

Figure 3C:
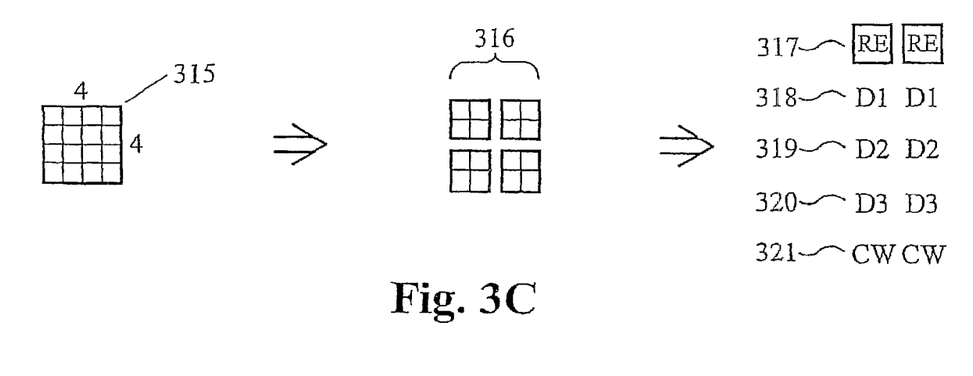

In FIG. 3C, the sixteen representative elements 310 form a new tile 315. The 4×4 tile 315 of representative elements 310 is divided into quads of data 316. Each quad of data is converted into a representative element 317, a first delta element 318, a second delta element 319, a third delta element 320 and a control word 321. The division of the 4×4 tile 315 yields four quads 316. After conversion of the quads of data 316, four representative elements 317, four first delta elements 318, four second delta elements 319, four third delta elements 320, and four control words 321 are produced.

Figure 3D:
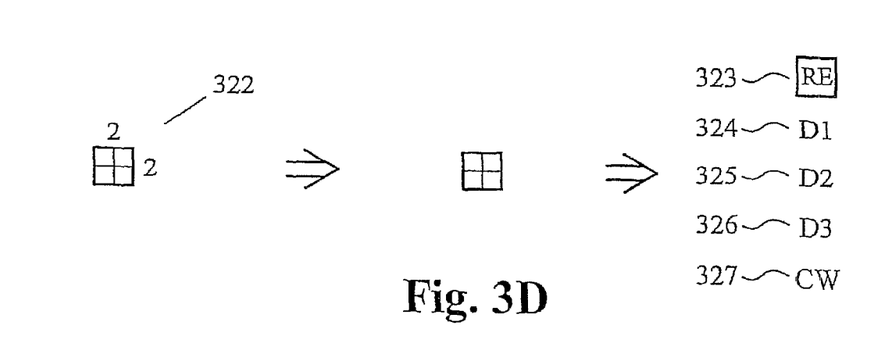

In FIG. 3D, the four representative elements 317 form a new tile 322. The 2×2 tile 322 of representative elements 317 cannot be divided into any further quads of data. Thus, the tile of data 322 is the top quad of data 322. The quad of data 322 is converted into a single representative element 323, a first delta element 324, a second delta element 325, a third delta element 326 and a control word 327. The single representative element 323 is the top of the hierarchy of data. The next level of the hierarchy are the delta elements 324, 325, 326 and control word 327 converted from the 2×2 tile of data 322. The next level of the hierarchy are the delta elements 318, 319, 320 and control words 321 converted from the 4×4 tile of data 315. The next level of the hierarchy are the delta elements 311, 312, 313 and control words 314 converted from the 8×8 tile of data 308. The next level of the hierarchy are the delta elements 304, 305, 306 and control words 307 converted from the 16×16 tile of data 301.

In alternate embodiments, the tiles of data can be divided in any convenient and/or known manner to produce similar results. Also, in alternate embodiments, the quads can be converted in any convenient and/or known manner using a variety of techniques to produce similar results. Further, in alternate embodiments, the conversions of the quad can be different and/or dependent on data format.

Figure 4:
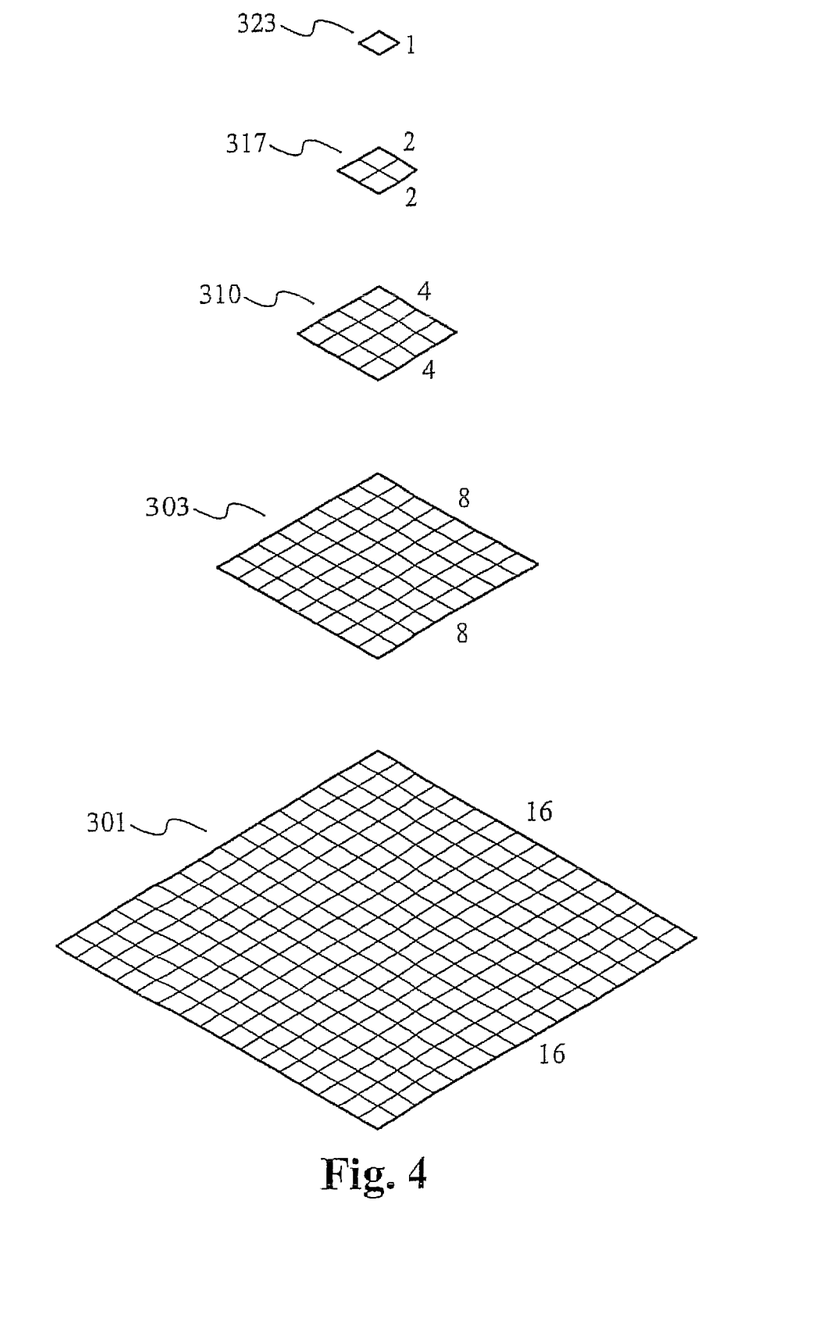
FIG. 4 shows a hierarchy of the tiles of data, in accordance with an embodiment of the present invention.

FIG. 4 shows a hierarchy of the tiles of data, in accordance with an embodiment of the present invention. The top of the hierarchy is the single representative element 323 from the second level of the hierarchy. The second level of the hierarchy is a tile of the representative elements 317 from the third level of the hierarchy. The third level of the hierarchy is a tile of the representative elements 310 from the fourth level of the hierarchy. The fourth level of the hierarchy is a tile of the representative elements 303 from the fifth level of the hierarchy. The fifth level of the hierarchy is a tile of the transformed square of data 301.

Figure 5:
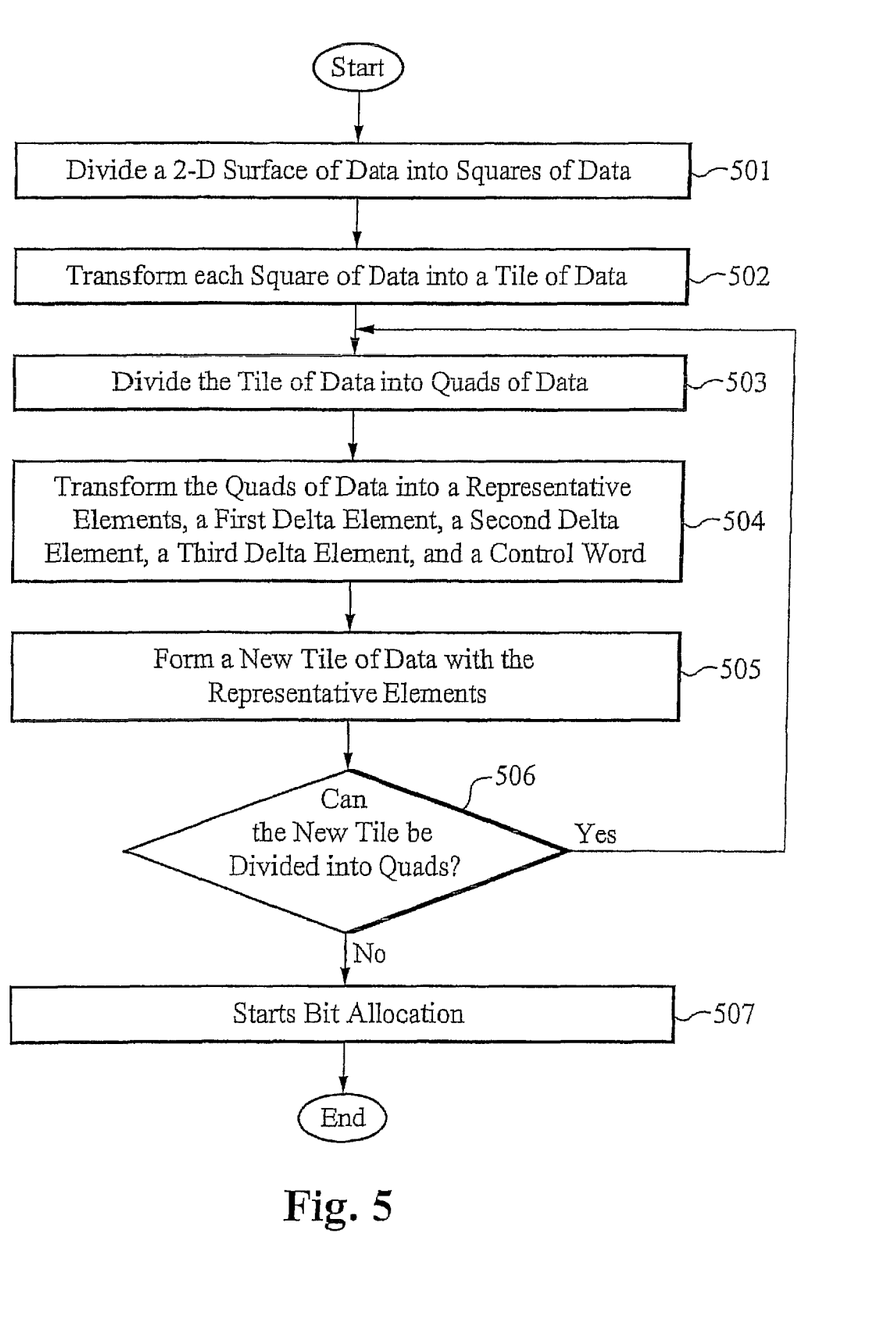
FIG. 5 shows the data compression method in graphical form, in accordance with an embodiment of the present invention.

FIG. 5 shows the data compression method in graphical form, in accordance with an embodiment of the present invention. In step 501, a two-dimensional surface of data is divided into squares of data. Preferably, each square of data is compressed independently and performed in parallel. The squares of data are preferably 16×16 squares of data, but can be any convenient and/or known size of squares of data. In step 502, each square of data is transformed into a tile of data. Preferably, the transform depends on the data type used. In step 503, the tile of data is divided into quads of data. Preferably, the quads of data are 2×2. In step 504, each quad of data is converted into a representative element, a first delta element, a second delta element, a third delta element, and a control word. In step 505, a new tile of data is formed with the representative elements resulting from the conversion.

In decision operation 506, it is determined whether the new tile can be divided into quads. If the new tile of data can be divided into quads, the process is looped back to step 503 where the tile is divided into quads of data. The method continues from there.

However, if the new tile of data cannot be divided into quads, in step 507, the bits of the hierarchy of data are encoded and allocated into an output stream. The method is then completed.

Figure 6:
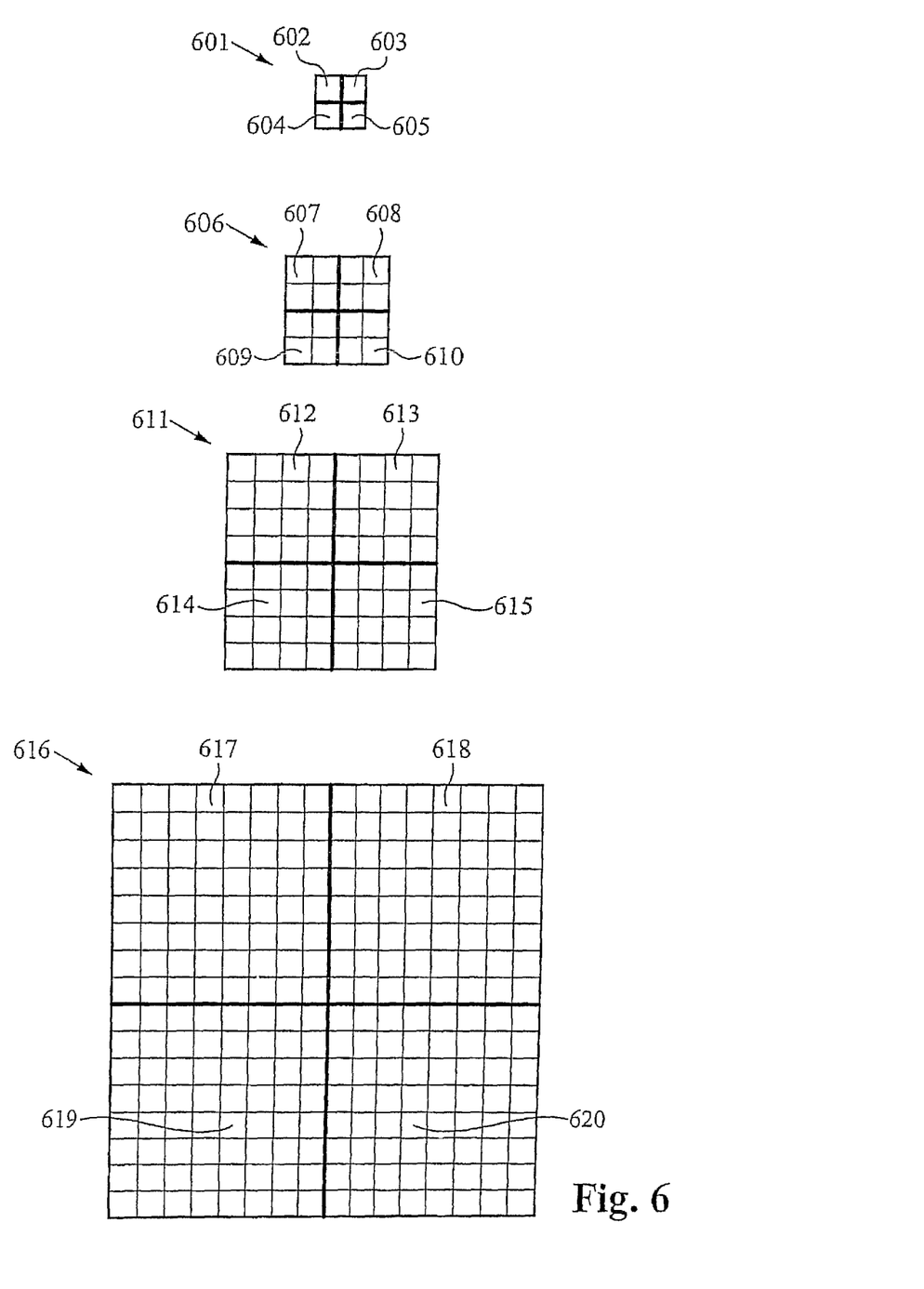
FIG. 6 shows the sub-tile pattern preferably used for encoding and embedding the hierarchical data into an output stream, in accordance with an embodiment of the present invention.

FIG. 6 shows the sub-tile pattern preferably used for encoding and embedding the hierarchical data into an output stream, in accordance with an embodiment of the present invention. Each tile in the hierarchy of data is divided into four sub-tiles. Starting from the top of the hierarchy, the top tile 601, the top quad of data, is divided into sub-tile zero 602, sub-tile one 603, sub-tile two 604, and sub-tile three 605. The next level of the hierarchy 606, the 4×4 tile of data, is also divided into sub-tile zero 607, sub-tile one 608, sub-tile two 609, and sub-tile three 610. The next level of the hierarchy 611, the 8×8 tile of data, is also divided into sub-tile zero 612, sub-tile one 613, sub-tile two 614, and sub-tile three 615. The next and bottom level of the hierarchy 616, the 16×16 transformed square of data, is also divided into sub-tile zero 617, sub-tile one 618, sub-tile two 619, and sub-tile three 620. Preferably, the encoding and/or embedding process starts at the top with the delta elements for sub-tile zero 602 and proceeds down the sub-tile zero hierarchy 607, 612, 617. Next, the encoding and/or embedding process starts at the top with the delta elements for sub-tile one 603 and proceeds down the sub-tile one hierarchy 608, 613, 618. Then, the encoding and/or embedding process starts at the top with the delta elements for sub-tile two 604 and proceeds down the sub-tile two hierarchy 609, 614, 619. Finally, the encoding and/or embedding process starts at the top with the delta elements for sub-tile three 605 and proceeds down the sub-tile three hierarchy 610, 615, 620. The sub-tile pattern allows for parallel bit stream decoding and the ability to abort bit allocation if all underlying deltas in a sub-tile are zero.

Figure 7:
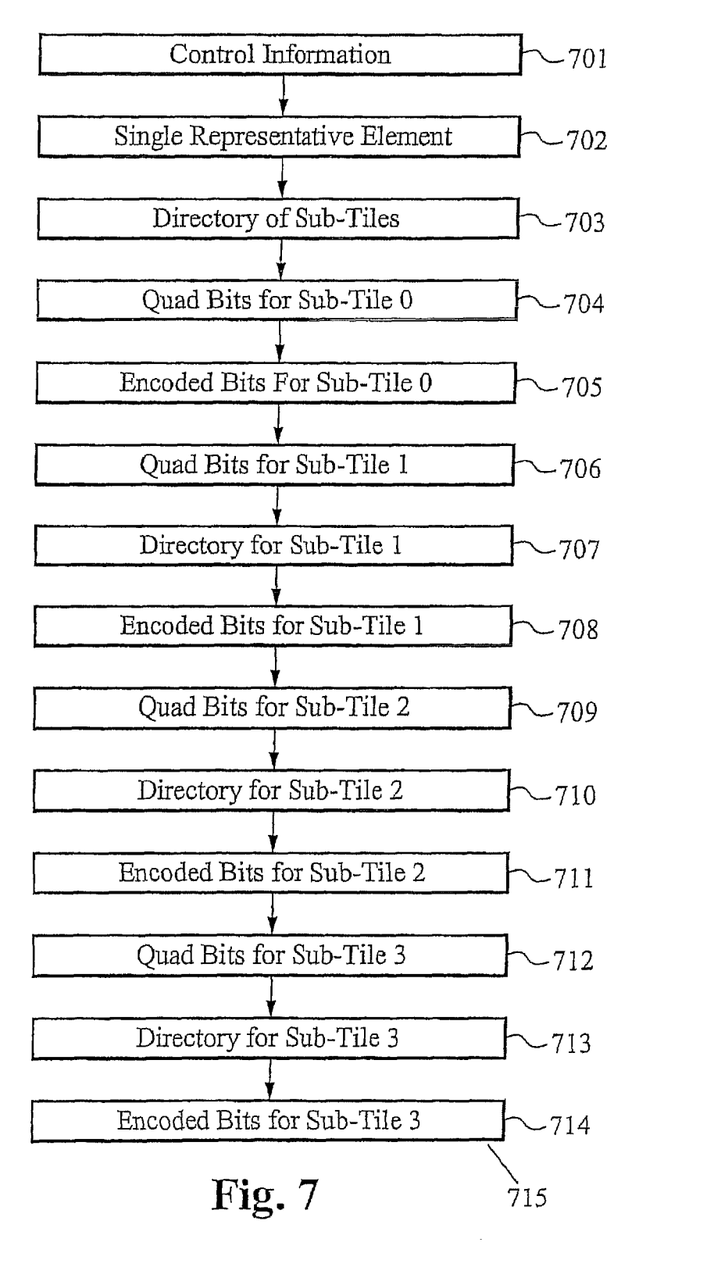
FIG. 7 shows a bit-allocated output stream of hierarchical data, in accordance with an embodiment of the present invention.

FIG. 7 shows a bit-allocated output stream of hierarchical data, in accordance with an embodiment of the present invention. The bits representing the control information 701 is embedded into the output stream 715. The control information preferably depends on data type. For example, control bits representing 256 bitmap of the signs of the data can be embedded if the format used is normal map and/or Z buffer. Following the control information 701, the bits representing the single representative element 702 from the top of the hierarchy of data is embedded into the output stream 715. Following the single representative element 702, the bits representing the directory of sub-tiles 703 is embedded into the output stream 715. The directory preferably comprises of three offsets. Following the directory of sub-tiles 703, the delta elements are encoded according to the corresponding control word. If, for example, the data format is Z buffer data, the encoding can follow the formula where PUT (From, Amount) is the function to send the Amount of bits From a particular delta element, D0 represents the control word, D1 represents delta one, D2 represents delta 2, and D3 represents delta three:

```
PUT (D0, 6)
If D0 == 2
    No other data is embedded into the stream for the hierarchy.
If D0 == 3
    If    D1=Y, D2=N, D3=N or
          D1=N, D2=Y, D3=N or
```

```
          D1=N, D2=N, D3=Y
          Then 5 bit prefix, sign bit and 1 value encoded.
    If    D1=N, D2=Y, D3=Y or
          D1=Y, D2=N, D3=Y or
          D1=Y, D2=Y, D3=N
          Then 5 bit prefix, sign bit and 2 values encoded.
    If    D1=Y, D2=Y, D3=Y
          Then 5 bit prefix, sign bit and 3 values encoded.
```

If, for example, the data format is color or normal map data, the encoding can follow the formula where PUT (From, Amount) is the function to send the Amount of bits From a particular delta element, PUT_SIGN (Value) is the function to send the sign of the Value if the Value is not zero, D0 represents the control word, D1 represents delta one, D2 represents delta two, D3 represents delta three, and LSB represents the average of the delta elements:

```
PUT (D0, 3)
If D0 = 0
    No other data is embedded into the stream for the hierarchy.
If D0 = 7
    No other data is embedded into the stream.
If D0 == 1
    PUT (D1, 1);
    PUT_SIGN (D1);
    PUT (D2, 1);
    PUT_SIGN (D2);
    PUT (D3, 1);
    PUT_SIGN (D3);
If D0 == 2
    PUT (D1, 2);
    PUT_SIGN (D1);
    PUT (D2, 2);
    PUT_SIGN (D2);
    PUT (D3, 2);
    PUT_SIGN (D3);
If D0 == 3
    PUT (D1, 3);
    PUT_SIGN (D1);
    PUT (D2, 3);
    PUT_SIGN (D2);
    PUT (D3, 3);
    PUT_SIGN (D3);
If D0 == 4
    PUT (LBS, 2);
        If LSB has explicit sign then PUT (LBS_SIGN, 1);
    PUT (D1, 3);
    PUT_SIGN (D1);
    PUT (D2, 3);
    PUT_SIGN (D2);
    PUT (D3, 3);
    PUT_SIGN (D3);
If D0 == 5
    PUT (LBS, 2);
        If LSB has explicit sign then PUT (LBS_SIGN, 1);
    PUT (D1, 4);
    PUT_SIGN (D1);
    PUT (D2, 4);
    PUT_SIGN (D2);
    PUT (D3, 4);
    PUT_SIGN (D3);
If D0 == 6
    PUT (D1, 8);
    PUT_SIGN (D1);
    PUT (D2, 8);
    PUT_SIGN (D2);
    PUT (D3, 8);
    PUT_SIGN (D3);
```

Once the delta elements are encoded according to the corresponding control word, the bits representing the top quad for sub-tile zero 704 are embedded into the output stream 715. Then, the bits representing the quads on the lower levels of the hierarchy for sub-tile zero 705 are embedded. Next, the bits representing the top quad for sub-tile one 706 are embedded. Then, the bits representing the sub-tile directory for sub-tile one 707 are embedded. Next, the bits representing the quads on the lower levels of the hierarchy for sub-tile one 708 are embedded. Then, the bits representing the top quad for sub-tile two 709 are embedded. Next, the bits representing the sub-tile directory for sub-tile two 710 are embedded. Then, the bits representing the quads on the lower levels of the hierarchy for sub-tile two 711 are embedded. Next, the bits representing the top quad for sub-tile three 712 are embedded. Then, the bits representing the sub-tile directory for sub-tile three 713 are embedded. Next, the bits representing the quads on the lower levels of the hierarchy for sub-tile three 714 are embedded.

In alternate embodiments, the delta elements can be encoded in any convenient and/or known manner. For example, depending on data format, a variety of formulas can be used to accomplish similar encoding results. In addition, the delta elements can be embedded in any convenient and/or known manner. For example, the delta elements can be embedded on a tile pattern rather than a sub-tile pattern. Further, additional data can be embedded into the output stream. For example, additional control information can be added throughout the output stream depending on data format. Still, data can be removed from the output stream to further compression. For example, the bits representing the directories can be removed providing greater compression.

Figure 8:
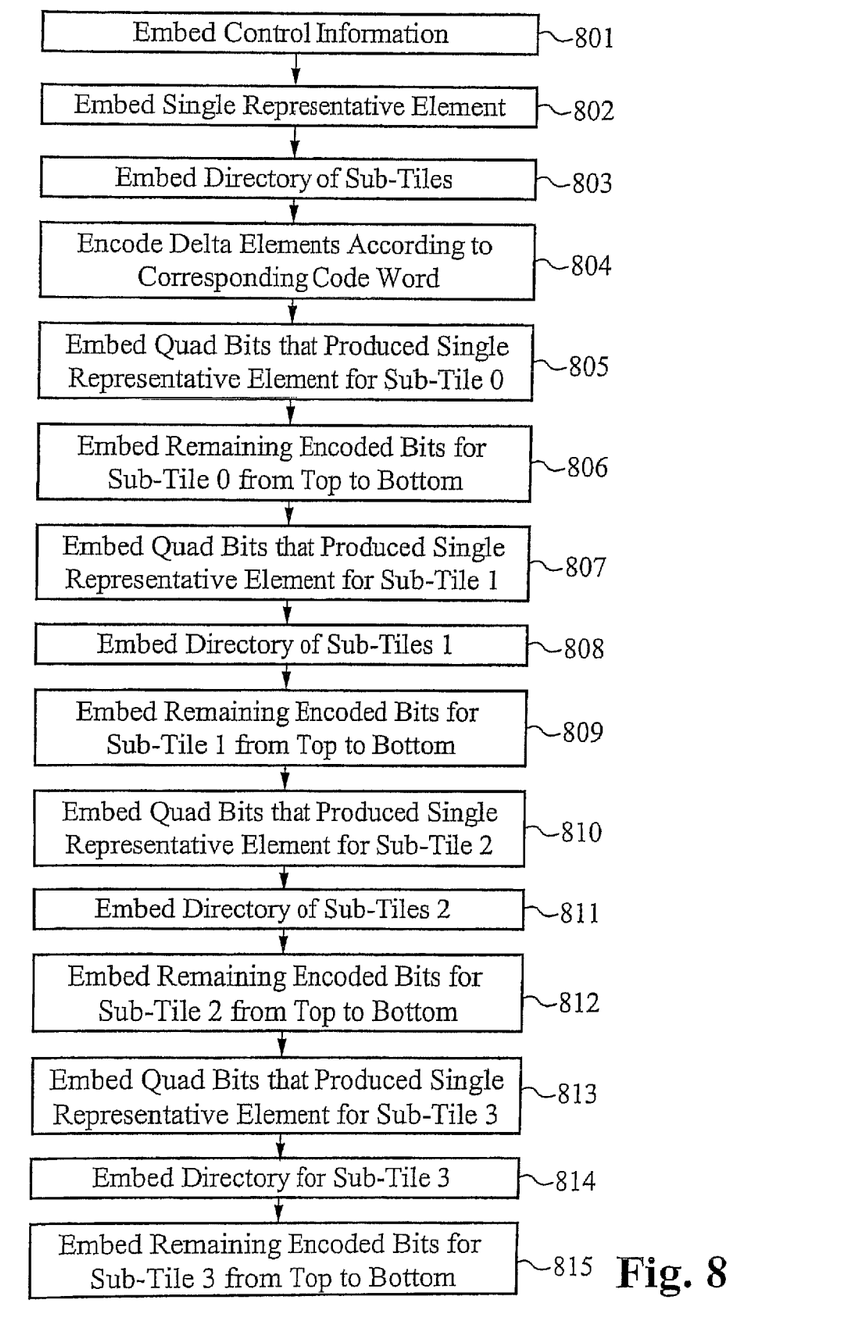
FIG. 8 shows bit allocation in graphical form, in accordance with an embodiment of the present invention.

FIG. 8 shows bit allocation in graphical form, in accordance with an embodiment of the present invention. Control information 801 is embedded into the output stream. In alternate embodiments, the control information can be eliminated to further compression. Next, the single representative element 802 is embedded into the stream. Following the single representative element 802, the directory of the sub-tiles 803 is embedded into the output stream. In alternate embodiments, the directory of the sub-tiles 803 can be eliminated to further compression. Next, the delta elements are encoded according to corresponding one or more control words 804. The encoding preferably follows a sub-tile pattern. In alternate embodiments, the deltas can be encoded at any convenient time during the process. Then, the bits representing the top quad for sub-tile zero 805 are embedded into the output stream followed by the bits representing the remaining quads for sub-tile zero 806. The bits representing the top quad for sub-tile one 807 are then embedded followed by a directory for sub-tile one 808. In alternate embodiments, the directory can be eliminated to further compression. The remaining bits representing the quads for sub-tile one 809 are then embedded into the output stream, Next, the bits representing the top quad for sub-tile two 810 are embedded into the output stream. Following the bits representing the top quad for sub-tile two 810, the bits representing the directory for sub-tile two 811 are embedded. In alternate embodiments, the directory can be eliminated to provide further compression. Then, the remaining bits representing the quads for sub-tile two 812 are embedded. The bits representing the top quad for sub-tile three 813 are then embedded followed by a directory for sub-tile three 814. In alternate embodiments, the directory can be eliminated to provide further compression. The remaining bits representing the quads for sub-tile three 815 are then embedded into the output stream.

The data compression method of embodiments of the present invention transforms a square of data into a tile of data. The tile of data is then divided into quads of data that are converted into a representative element, a first delta element, a second delta element, a third delta element and a control word. A new tile of data is then formed with the representative elements and the process is repeated until a single representative element remains. The single representative element is then embedded into an output stream with the control words and corresponding delta elements.

System and Method Implementation of Data Compression

Portions of embodiments of the present invention can be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention can also be implemented by the preparation of application specific integrated circuits or by interconnecting an appropriate network of conventional component circuits, as will be readily apparent to those skilled in the art. The implementation in integrated circuits may be accomplished through the creation of software code (e.g., code in a hardware description language) that when synthesized and processed are arranged to configure a manufacturing process (such as those in a semiconductor foundry) to manufacture a semiconductor integrated circuit capable of embodying aspects of the present invention Embodiments of the present invention includes a computer program product which is a storage medium (media) having instructions (e.g., software, firmware and/or hardware instructions including hardware description language code) stored thereon/in which can be used to control, or cause, a computer to perform any of the processes of embodiments of the present invention. The storage medium can include, but is not limited to, any type of disk including floppy disks, mini disks (MD's), optical disks, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), embodiments of the present invention includes software for controlling both the hardware of the general purpose/specialized computer or microprocessor, and for enabling the computer or microprocessor to interact with a human user or other mechanism utilizing the results of embodiments of the present invention. Such software can include, but is not limited to, device drivers, operating systems, and user applications. Ultimately, such computer readable media further includes software for performing embodiments of the present invention, as described above.

Included in the programming (software) of the general/specialized computer or microprocessor are software modules for implementing the teachings of embodiments of the present invention, including but not limited to providing a square of data, transforming the square of data into a tile of data, dividing the tile of data into quads of data, converting each quad into a representative element, forming a new tile of data with the representative elements, repeating until a single representative element remains, and embedding the single representative element, the control words and the delta elements into an output stream, according to processes of embodiments of the present invention.

Embodiments of the present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. For example, different formulas for encoding and/or embedding and/or a variety of data and/or data formats can be added and/or removed to perform the functions of the embodiments illustrated.

What is claimed is:

1. A graphics data compression method, carried out by a computer, comprising:
   providing a square of graphics data;
   transforming the square of graphics data into a tile of data;
   dividing the tile of data into quads of data, each quad having an upper left pixel, an upper right pixel, a lower left pixel, and a lower right pixel;
   converting each quad into a representative element, a first delta element, a second delta element, a third delta element, and a control word;
   forming a new tile of data with the representative elements converted from each converted quad of data;
   repeating the dividing, the converting, and the forming operations until a single representative element remains, and
   wherein the new tile of data becomes the tile of data for a next repetition of dividing, converting and forming in the repetition; and
   embedding the single representative element, the control words and the delta elements into an output stream.

2. The method of claim 1, wherein the square of graphics data is a division of a two-dimensional surface of data.

3. The method of claim 1, wherein the graphics data is at least one of: Z-buffer data, color buffer data and normal map data.

4. The method of claim 3, wherein transforming the square of graphics data into a tile of data comprises replacing each data value with a new data value, the new data value being equal to the data value subtracted by an adjacent data value.

5. The method of claim 1, wherein transforming the square of graphics data into a tile of data comprises replacing each data value with a decorrelated data value.

6. The method of claim 1, wherein transforming the square of graphics data into a tile of data comprises replacing each data value with a new data value having one less component.

7. The method of claim 1, wherein converting each quad comprises:
   setting the upper left pixel as the representative element;
   subtracting the upper right pixel by the upper left pixel, thereby forming the first delta element;
   subtracting the lower left pixel by the upper left pixel, thereby forming the second delta element;
   subtracting the lower right pixel by the lower left pixel, thereby forming the third delta; and
   setting the control word according to a correlation between the delta elements.

8. The method of claim 1, wherein control information is embedded into the output stream.

9. The method of claim 1, wherein a directory of sub-tiles is embedded into the output stream, the directory of sub-tiles being formed from the results of the dividing, the converting and the forming operations.

10. The method of claim 1, wherein the embedding follows a sub-tile pattern.

11. The method of claim 1, further comprising encoding the delta elements according to their associated control words.

12. A non-transitory program storage device readable by a machine, tangibly embodying a program of instructions executable to perform a data compression method comprising:
   providing a square of data;
   transforming the square of data into a tile of data;
   dividing the tile of data into quads of data, each quad having an upper left pixel, an upper right pixel, a lower left pixel, and a lower right pixel;
   converting each quad into a representative element, a first delta element, a second delta element, a third delta element, and a control word;
   forming a new tile of data with the representative elements converted from each converted quad of data;
   repeating the dividing, the converting, and the forming operations until a single representative element remains, and
   wherein the new tile of data becomes the tile of data for a next repetition of dividing, converting and forming in the repetition; and
   embedding the single representative element, the control words and the delta elements into an output stream.

13. The non-transitory program storage device of claim 12, wherein the square of data is a division of a two-dimensional surface of data.

14. The non-transitory program storage device of claim 12, wherein the data is at least one of: Z-buffer data, color buffer data and normal map data.

15. The non-transitory program storage device of claim 14, wherein transforming the square of data into a tile of data comprises replacing each data value with a new data value, the new data value being equal to the data value subtracted by an adjacent data value.

16. The non-transitory program storage device of claim 12, wherein transforming the square of data into a tile of data comprises replacing each data value with a decorrelated data value.

17. The non-transitory program storage device of claim 12, wherein transforming the square of data into a tile of data comprises replacing each data value with a new data value having one less component.

18. The non-transitory program storage device of claim 12, wherein converting each quad comprises:
   setting the upper left pixel as the representative element;
   subtracting the upper right pixel by the upper left pixel, thereby forming the first delta element;
   subtracting the lower left pixel by the upper left pixel, thereby forming the second delta element;
   subtracting the lower right pixel by the lower left pixel, thereby forming the third delta; and
   setting the control word according to a correlation between the delta elements.

19. The non-transitory program storage device of claim 12, wherein control information is embedded into the output stream.

20. The non-transitory program storage device of claim 12, wherein a directory of sub-tiles is embedded into the output stream, the directory of sub-tiles being formed from the results of the dividing, the converting and the forming operations.

21. The non-transitory program storage device of claim 12, wherein the embedding follows a sub-tile pattern.

22. The non-transitory program storage device of claim 12, further comprising encoding the delta elements according to their associated control words.

* * * * *